(12) United States Patent
June

(10) Patent No.: US 7,566,045 B2
(45) Date of Patent: Jul. 28, 2009

(54) HYDRAULIC COUPLER

(75) Inventor: David June, Houston, TX (US)

(73) Assignee: Cameron International Corporation, Houston, TX (US)

( * ) Notice: Subject to any disclaimer, the term of this patent is extended or adjusted under 35 U.S.C. 154(b) by 1499 days.

(21) Appl. No.: 10/393,422

(22) Filed: Mar. 20, 2003

(65) Prior Publication Data

US 2004/0186420 A1    Sep. 23, 2004

(51) Int. Cl.
*F16K 51/00*    (2006.01)
*F16L 37/28*    (2006.01)
*F16L 29/00*    (2006.01)

(52) U.S. Cl. .............................. 251/149.6; 137/625.48; 137/882; 251/149.1

(58) Field of Classification Search .............. 251/149.6, 251/149.1; 137/625.48, 871, 882
See application file for complete search history.

(56) References Cited

U.S. PATENT DOCUMENTS

| | | | | |
|---|---|---|---|---|
| 2,705,501 A * | 4/1955 | Fritzsch | ...................... | 137/112 |
| 2,727,759 A | 12/1955 | Elliot | ......................... | 284/185 |
| 2,846,013 A | 8/1958 | Davis | ........................ | 166/75 |
| 3,043,371 A | 7/1962 | Rector | ........................ | 166/86 |
| 3,151,892 A | 10/1964 | Word, Jr. | ..................... | 285/137 |
| 3,635,184 A | 1/1972 | Liautaud | ..................... | 114/51 |
| 3,638,732 A | 2/1972 | Huntsinger et al. | ........... | 166/315 |
| 3,721,296 A | 3/1973 | Tubbs | ........................ | 166/88 |
| 3,781,857 A | 12/1973 | Stendig et al. | .............. | 340/420 |
| 3,807,497 A | 4/1974 | Baugh | ........................ | 166/85 |
| 3,848,949 A | 11/1974 | Falkner | ..................... | 339/75 |
| 4,289,199 A | 9/1981 | McGee | ........................ | 166/65 |
| 4,491,176 A | 1/1985 | Reed | ............................ | 166/65 |
| 4,736,799 A | 4/1988 | Ahlstone | .................... | 166/348 |
| 4,795,359 A | 1/1989 | Alcock et al. | ................ | 439/271 |
| 4,859,196 A | 8/1989 | Durando et al. | .............. | 439/197 |
| 4,907,980 A | 3/1990 | Wagaman et al. | ............ | 439/204 |
| 5,147,333 A * | 9/1992 | Raines | ....................... | 604/249 |

(Continued)

FOREIGN PATENT DOCUMENTS

DE    2 059 081    6/1971

(Continued)

OTHER PUBLICATIONS

British Search Report for Appln. GB0405808.7 dated Jul. 27, 2004; (2 p.).

*Primary Examiner*—John K Fristoe, Jr.
(74) *Attorney, Agent, or Firm*—Conley Rose, P.C.

(57) ABSTRACT

A hydraulic coupler adapted to select the supply of fluid from a first source or a second source. The fluid selection is achieved by mechanically shifting a fluid selector with a male stab member that also supplies the second fluid source. When shifted, the fluid selector positively blocks the first fluid source and opens a hydraulic pathway for the second fluid source. When the male stab is disengaged, the fluid selector is pressure biased by internal and external pressure to a position allowing fluid flow from the first fluid source and preventing external fluids from entering the hydraulic system. In certain embodiments the hydraulic coupler is horizontally installed in a tubing hanger providing horizontal porting for connection with a subsea christmas tree and vertical porting for connection to a running tool. The coupler prevents riser fluid contamination of the hydraulic system regardless of the differential pressure between the riser fluid and the hydraulic system.

17 Claims, 3 Drawing Sheets

U.S. PATENT DOCUMENTS

| | | | |
|---|---|---|---|
| 5,194,012 A | 3/1993 | Cairns | 439/201 |
| 5,201,853 A | 4/1993 | Alwine | 439/188 |
| 5,558,532 A | 9/1996 | Hopper | 439/310 |
| 5,560,548 A * | 10/1996 | Mueller et al. | 239/442 |
| 6,082,460 A | 7/2000 | June | 166/348 |
| 6,200,152 B1 | 3/2001 | Hopper | 439/310 |
| 6,569,117 B1 * | 5/2003 | Ziv et al. | 604/164.01 |

FOREIGN PATENT DOCUMENTS

| | | |
|---|---|---|
| EP | 0 251 655 | 6/1987 |
| EP | 0 493 375 | 7/1992 |
| FR | 2 431 649 | 2/1980 |
| GB | 2 058 881 | 4/1981 |
| GB | 2 165 284 | 4/1986 |
| GB | 2 292 571 | 2/1996 |

* cited by examiner

HYDRAULIC COUPLER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The embodiments of the present invention relate generally to methods and apparatus for hydraulically coupling two components. More particularly, the embodiments provide a hydraulic coupler that shifts the supply of hydraulic fluid from a first source to a second source and prevents external fluid pressure from entering the hydraulic fluid paths. Still more particularly, the embodiments of the present invention relate to hydraulic couplers for subsea equipment, such as hydraulic couplers integrated into a tubing hanger that allow selection between hydraulic control from a running tool and hydraulic control from a subsea christmas tree.

In performing a well completion, a tubing hanger supporting a tubing string and downhole control members is placed within a well and landed on a wellhead member, such as a subsea Christmas tree. Hydraulic control lines extend from the tubing hanger to selected downhole control members, such as a downhole safety valve or a downhole chemical injection member, for actuation and control of the downhole control members. Hydraulic control fluid passages in the wellhead member and the tubing hanger are aligned in the landed position of the tubing hanger for the supply of the hydraulic control fluid from the wellhead member through the tubing hanger to downhole control members.

To move the tubing hanger to the wellhead, the hanger is releasably connected to a running tool and lowered through a riser connected to the well. The running tool is disconnected from the tubing hanger after landing of the tubing hanger on the wellhead member and hydraulic connectivity has been established between the tubing hanger and the wellhead member. It is often desirable that hydraulic control fluid be supplied, or have the capability of being supplied, to certain downhole control members before the tubing hanger is landed on the wellhead member and under control of the subsea wellhead member. In order to facilitate this control, hydraulic control fluid circuitry extends through a running tool for the supply of hydraulic control fluid to the tubing hanger and the downhole control members and the tubing hanger is constructed so as to receive hydraulic signals from the running tool.

Thus, because it is desirable to have the downhole control members under positive hydraulic control at all times, at least two alternate hydraulic fluid paths are required for each control line, a first path from the running tool and a second path for connection to the wellhead member. During the installation of the tubing hanger, the first hydraulic fluid path from the running tool is engaged and in use but the second hydraulic fluid path is left accessible so as to facilitate subsea connection to the wellhead member. Although the second hydraulic fluid path must be able to be connected to the wellhead member, it should also be protected from the ingress of external fluids, such as fluids in the riser, that may tend to contaminate the hydraulic system or interfere with proper operation of the downhole control members. The ingress of drilling fluids from the riser is of particular concern when the drilling fluid has a much higher density or is at a higher pressure than the hydraulic fluid in the tubing hanger and running tool.

Therefore, it is desirable to have a system that shifts the supply of hydraulic fluid to the tubing hanger from the running tool to the wellhead member and isolates the non-active hydraulic fluid path in order to prevent contamination or interference with the desired hydraulic communication. Therefore, the embodiments of the present invention are directed to methods and apparatus for providing for the selection between two hydraulic fluid supplies while protecting the hydraulic system from contamination that seek to overcome the limitations of the prior art.

SUMMARY OF THE PREFERRED EMBODIMENTS

The preferred embodiments provide a hydraulic coupler adapted to select the supply of fluid from a first source or a second source. The fluid selection is achieved by mechanically shifting a fluid selector with a male stab member that also supplies the second fluid source. When shifted the fluid selector positively blocks the first fluid source and opens a hydraulic pathway for the second fluid source. When the male stab is disengaged, the fluid selector is pressure biased by internal and external pressure to a position allowing fluid flow from the first fluid source and preventing external fluids from entering the hydraulic system. In certain embodiments the hydraulic coupler is horizontally installed in a tubing hanger providing horizontal porting for connection with a subsea Christmas tree and vertical porting for connection to a running tool, while preventing riser fluid contamination of the hydraulic system regardless of the differential pressure between the riser fluid and the hydraulic system.

In certain embodiments, the hydraulic coupler includes a body having a first fluid supply port and a fluid return port. The body, which may be attached to or integral with another component, such as a tubing hanger, includes a cavity intersecting both the first fluid supply port and the fluid return port. A selector is disposed within and sealingly engages the body cavity and has a first position that allows fluid communication between the first fluid supply port and the fluid return port. The body also includes a receptacle sealingly engaging the selector and including a fluid port that, with the selector in the first position, allows hydraulic pressure external to the coupler to bias the selector into the first position. A male stab, which includes a second fluid supply port, engages the receptacle and moves the selector from the first position to a second position. In the second position fluid communication between the first fluid supply port and the fluid return port is prevented while fluid communication is allowed between the second fluid supply port and the fluid return port.

In another preferred embodiment, a hydraulic coupler comprises a body having a first fluid supply port and a fluid return port in hydraulic communication. A selector is disposed within the body and has a first position that allows hydraulic communication between the first fluid supply port and the fluid return port. A receptacle is connected to the body and provides one or more fluid conduits that allow fluid pressure to bias the selector into the first position. The coupler also includes a stab having a second fluid supply port and adapted to mechanically shift the selector to a second position providing hydraulic communication between the second fluid supply port and the fluid return port and preventing hydraulic communication between the first fluid supply port and the fluid return port.

An alternate preferred embodiment includes a method of shifting fluid communication to a return port from a first supply port to a second supply port by providing a selector that has a first position that allows fluid communication between the first supply port and the return port. The selector is biased to the first position by external fluid pressure. Fluid supply is shifted by engaging a male stab that shifts the selector to a second position preventing fluid communication between the first supply port and the return port and allowing fluid communication between the second supply port and the return port.

Thus, the present invention comprises a combination of features and advantages that enable it to provide for positive selection between two hydraulic supply sources and prevent the contamination of the hydraulic system by elevated external pressures. These and various other characteristics and advantages of the preferred embodiments will be readily apparent to those skilled in the art upon reading the following detailed description and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
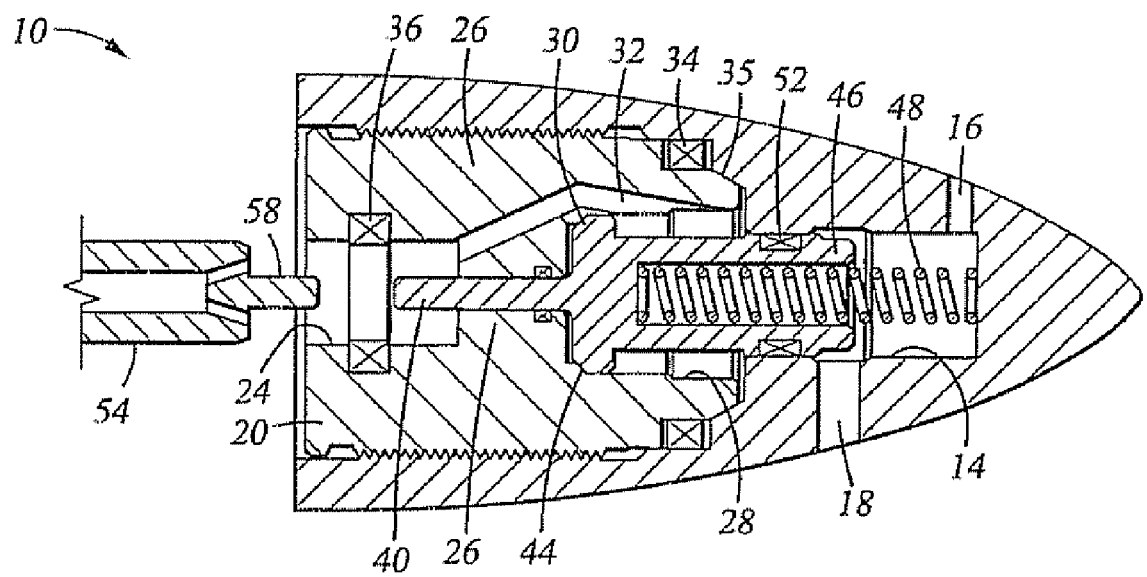
FIG. 1 is a partial sectional view of one embodiment of a hydraulic coupler in a disengaged position.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

In particular, various embodiments of the present invention provide a number of different methods and apparatus for selecting the hydraulic supply to a fluid path and protecting the fluid path from external pressure. The concepts of the invention are discussed in the context of a horizontally-oriented hydraulic coupler between a subsea tree and a tubing hanger, but the use of the concepts of the present invention is not limited to this particular application and may be applied in any hydraulic coupling application. The concepts disclosed herein may find application in other subsea oilfield components, as well as other hydraulically actuated components, both within oilfield technology and other applications to which the concepts of the current invention may be applied.

Figure 2:
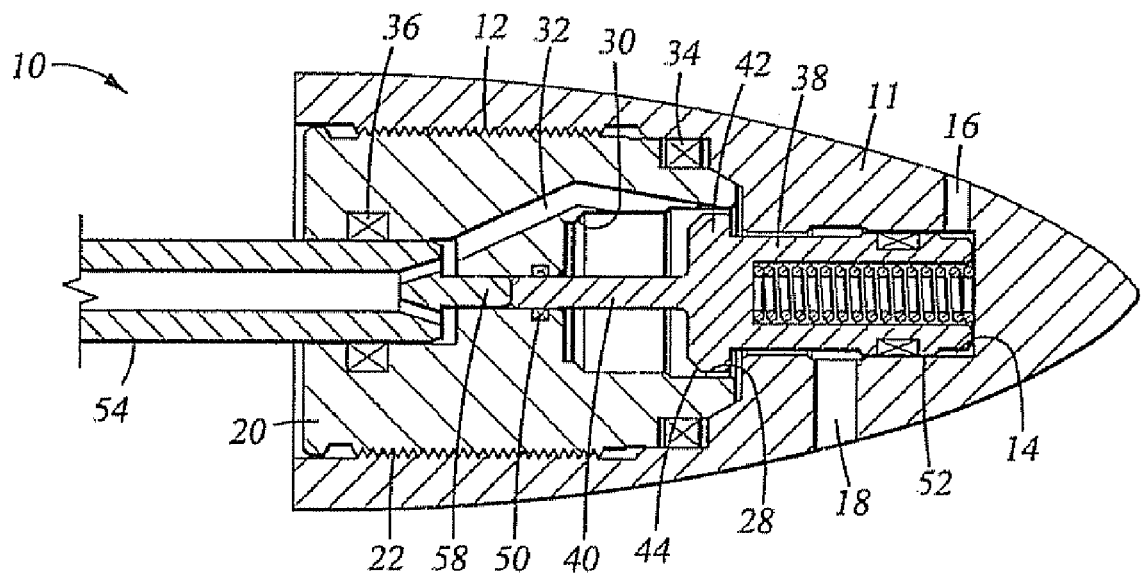
FIG. 2 is a partial sectional View of the coupler of FIG. 1 shown in an engaged position.

Referring to FIGS. 1 and 2, coupler 10 mounts to body 11 in threaded cavity 12 that leads into ported cavity 14 into which first fluid supply port 16 and fluid return port 18 are connected. Body 11 may be the body of a subsea component, such as a tubing hanger, or may be a separate, distinct housing constructed specifically as a coupler housing. Receptacle 20 is connected to body 11 by threads 22 and includes a stab cavity 24, neck 26, and hydraulic cavity 28 with shoulder 30. Bypass port 32 provides fluid communication between stab cavity 24 and hydraulic cavity 28. Receptacle seals 34 maintain a hydraulic seal between receptacle 20 and body 11 while stab seal 36 provides a seal between receptacle 20 and engaged stab 54. Selector 38 includes rod 40, flange 42 with face 44, and selector body 46 which may accommodate spring 48. Rod 40 seals against rod seal 50 in neck 26 while selector seal 52 seals against the wall of ported cavity 14. Stab 54 includes a second fluid supply port 56 and a probe 58.

Referring now to FIG. 1, hydraulic coupler 10 is shown with stab 54 in a disengaged position relative to receptacle 20. Selector 38 is in a first position allowing fluid communication between first fluid supply port 16 and fluid return port 18. Selector seal 52 seals against the wall of ported cavity 14 to isolate the hydraulic fluid flowing between ports 16 and 18. The combination of fluid pressure in ported cavity 14 and force from spring 48 act to keep selector 38 in the first position with face 44 against shoulder 30.

Selector 38 is also maintained in the first position by any external pressure acting on the coupler 10. External pressure will flow through bypass port 32 filling hydraulic cavity 28. Because a metal-to-metal seal will be formed between face 44 and shoulder 30, the pressure balance across selector 38 will also serve to maintain the selector in the first position, enabling fluid communication between first supply port 16 and return port 18. External fluid is prevented from entering the hydraulic system by seals 34 and 52. Thus, regardless of the differential pressure between the external fluid and the hydraulic operating fluid (or the pressure in port cavity 14), selector 38 will remain in the first position preventing ingress of external fluid into the hydraulic system.

Referring now to FIG. 2, coupler 10 is shown with stab 54 fully engaged. Selector 38 is pushed into a second position by probe 58 extending from stab 54. Once stab 54 is fully engaged, selector 38 is in the second position where seal 52 prevents hydraulic communication between first fluid supply port 16 and fluid return port 18. Second fluid supply port 56, which may be within stab 54, is now in fluid communication with return port 18 via bypass port 32, hydraulic cavity 28, and a portion of ported cavity 14. With selector 38 in the second position, selector seals 52 engage the wall of ported cavity 14, sealing off first fluid supply port 16 whereby all hydraulic communication to fluid return port 18 is from the second fluid supply port 56 and communication from the first fluid supply port 16 is prevented.

The design and selection of seals 34, 36, 50, and 52 are critical to the performance of coupler 10 and depend on the particular location of the seal and the pressure requirements of the system. The preferred seals are resilient thermoplastic or elastomeric seals suitable for use in hydraulic systems in subsea environments. These seals may be an o-ring, or reinforced o-ring type seals for basic, low wear applications, and may be elastomeric seals reinforced with a stiff support, such as metal or composite. For example, seal 34 is a stationary seal that is pressure balanced when the coupler 10 is disengaged (exposed to external hydraulic pressure on both sides) and is exposed to external pressure on one side and hydraulic pressure on the opposite side when the coupler is engaged. Thus, seal 34 may appropriately be a thermoplastic, metallic, or reinforced elastomeric seal.

In considering seals that are potentially environmental barriers and/or highly cycled, such as seals 36 and 52, a heavier duty, more robust seal design may be appropriate. Because these seals may repeatedly be subjected to energization and pressurization, a molded, metal reinforced elastomeric seal may be appropriate. It may also be preferred that this seal have a rounded or curved shape to reduce damage to the seal during repeated cycling. Those having skill in the arts of sealing hydraulic and subsea systems would realize any number of possible seal arrangements that may appropriate in this application and any combination or selection of seals may be possible. Additionally, the force generated by the make up of threads 22 on the interface 35 between body 11 and receptacle 20 may create a metal-to-metal seal barrier between neck 26 and body 11.

Figure 3:
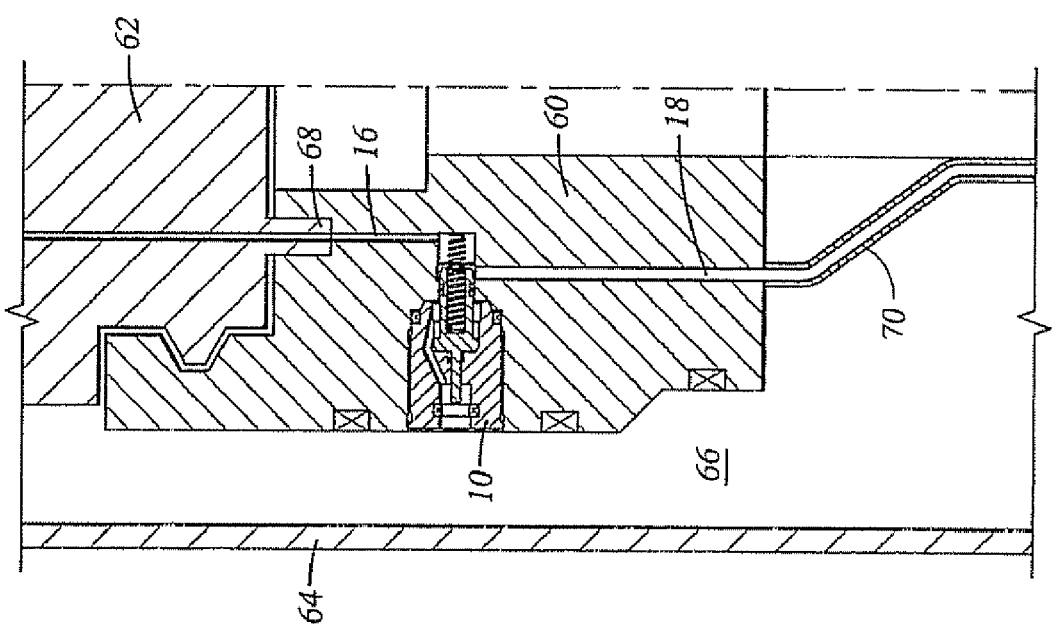
FIG. 3 is a schematic sectional view of a tubing hanger attached to a running tool and being run through a riser.

Referring now to FIG. 3, a tubing hanger 60 is shown attached to running tool 62 and being run through riser 64, which contains riser fluid 66. Tubing hanger 60 includes hydraulic coupler 10 as shown in FIGS. 1 and 2. Running tool 62 provides hydraulic fluid, via running tool stab 68, to first fluid supply port 16, through fluid return port 18 to conduit 70 in communication with a downhole hydraulic component (not shown), such as a downhole safety valve. In this manner, control of the downhole component can be effectuated during the running of tubing hanger 60 and the attached tubing string.

While being run through riser 64, tubing hanger 60 is subjected to external pressure from the riser fluid 66, which may have a density significantly higher than the surrounding seawater or the hydraulic fluid in the hanger. Therefore, the external pressure acting on the tubing hanger 60 is potentially much greater than the internal hydraulic pressure of the tubing system. Coupler 10 prevents the riser fluid from entering into the hydraulic system regardless of the differential pressure between the riser fluid and the hydraulic fluid.

Figure 4:
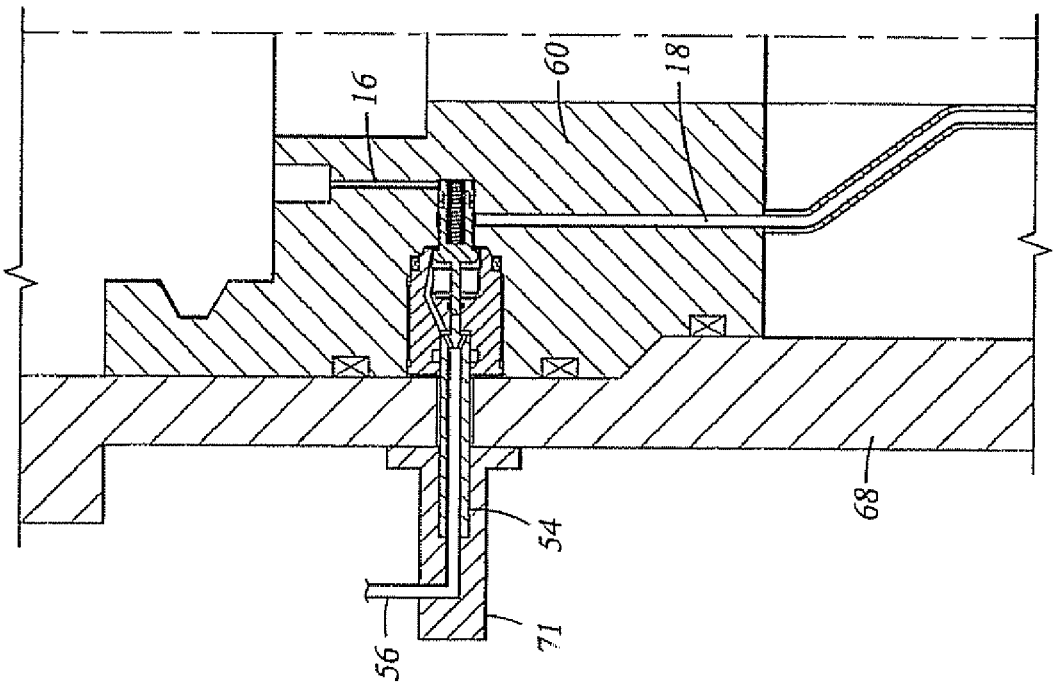
FIG. 4 is a schematic sectional view of the tubing hanger of FIG. 3 installed in a subsea tree.

Referring now to FIG. 4, tubing hanger 60 is shown installed into subsea tree 68. Stab 54 has been extended by actuator 71 and is fully engaged with coupler 10. Hydraulic fluid can now be supplied from tree 68 through second fluid supply port 56, through fluid return port 18 to control a downhole hydraulic component. Running tool 62 is detached from tubing hanger 60 and the engagement of stab 54 into coupler 10 isolates the first fluid supply port 16 so that control of the downhole components is shifted from the running tool to the tree 68. First fluid supply port 16 may also be fitted with a check valve (not shown) to prevent fluid from flowing from the hydraulic system out of port 16.

In FIGS. 3 and 4, hydraulic coupler 10 is shown as a component of a tubing hanger as an example of one particular use. It is to be understood that coupler 10, and other embodiments, may be used in other subsea hydraulic equipment. The unique combination of the ability to select and isolate a particular hydraulic source while preventing contamination from pressurized external fluids may prove useful in other applications, such as subsea manifolds, control systems, chokes, and valves.

Figure 5:
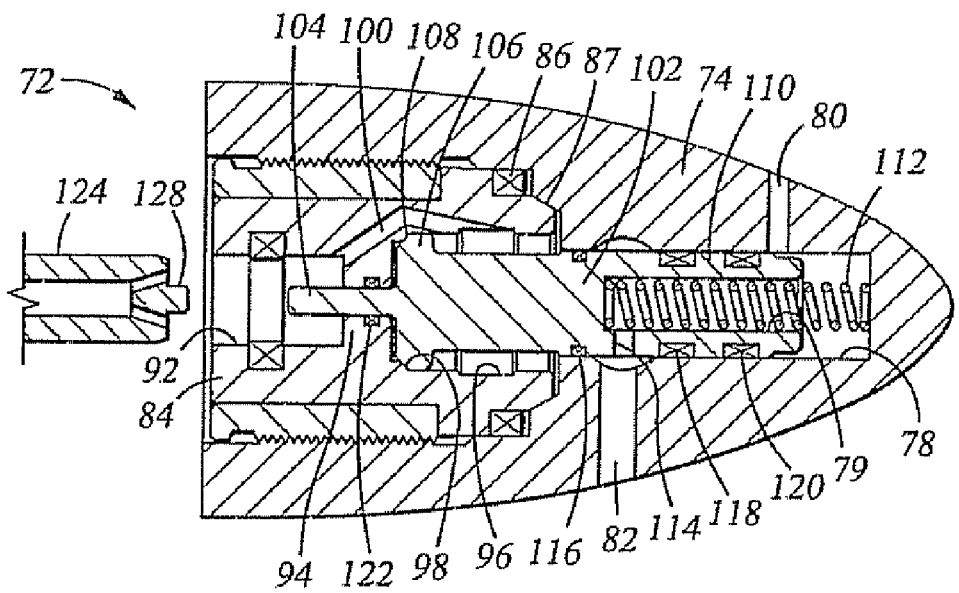
FIG. 5 is a partial sectional view of a hydraulic coupler in a disengaged position.
Figure 6:
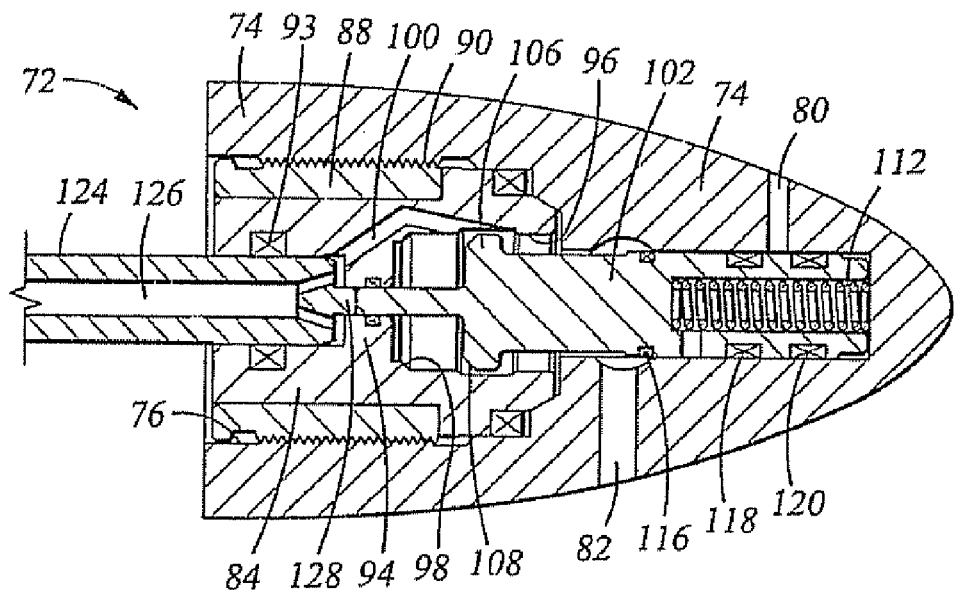
FIG. 6 is a partial section view of the hydraulic coupler of FIG. 5 shown in an engaged position.

Referring now to FIGS. 5 and 6, an alternative preferred embodiment of a hydraulic coupler 72 is installed in body 74, which may be the body of a subsea component, such as a tubing hanger, or may be a separate, distinct housing constructed specifically as a coupler housing. Coupler 72 mounts to body 74 in threaded cavity 76 that leads into ported cavity 78 into which first fluid supply port 80 and fluid return port 82 are connected. Receptacle 84 is inserted into cavity 76 and creates a pressure barrier at seal 86. Receptacle 84 is held in place by retainer 88 that engages body 74 at threads 90. Receptacle 84 includes a stab cavity 92, neck 94, and hydraulic cavity 96 with shoulder 98. Bypass port 100 provides fluid communication between stab cavity 92 and hydraulic cavity 96. Selector 102 includes rod 104, flange 106 having face 108, and selector body 110 which accommodates spring 112. Selector body 110 also includes fluid port 114 as well as seals 116, 118, and 120 for sealing against the wall of ported cavity 78. Rod 104 seals against rod seal 122 in neck 94. Stab 124 includes a second fluid supply port 126 and a probe 128.

Referring now to FIG. 5, hydraulic coupler 72 is shown with stab 124 in a disengaged position. Selector 102 is in a first position allowing fluid communication between first fluid supply port 80 and fluid return port 82. Seals 118 and 120 seal between selector body 110 and ported cavity 78 forcing the hydraulic fluid flowing from port 80 into cavity 78, through counterbore 79 housing spring 112, and through fluid port 114 to return port 82. Seal 116 prevents the hydraulic fluid from flowing out of ported cavity 78 and prevents external fluids from entering the hydraulic system.

Selector 102 is maintained in the first position, as shown in FIG. 5, by fluid pressure in ported cavity 78, force from spring 112 against body 74 and selector 102, and external pressure acting on body 74 and coupler 72. With selector 102 in the first position, face 108 bears against shoulder 98 and creates a metal-to-metal seal and rod seal 122 prevents pressure from passing between rod 104 and neck 94. External pressure is allowed to flow through bypass port 100 filling hydraulic cavity 96 in receptacle 84. Because of the metal-to-metal seal formed between face 108 and shoulder 98, the pressure balance across selector 102 will force the selector 102 into the first position, enabling fluid communication between first supply port 80 and return port 82. Thus, regardless of the differential pressure between the external fluid and the hydraulic operating fluid (or the pressure in ported cavity 78), selector 102 will remain in the first position preventing ingress of external fluid into the hydraulic system.

Referring now to FIG. 6, coupler 72 is shown with stab 124 fully engaged. Selector 102 is pushed into a second position by probe 128 extending from stab 124. Once stab 124 is fully engaged and sealed against seal 93, selector 102 is in the second position where seals 118 and 120, on each side of first fluid supply port 80, isolate port 80 and prevent hydraulic communication between the first fluid supply port 80 and fluid return port 82. Seal 116 is moved to a position to allow hydraulic communication between hydraulic cavity 96 in receptacle 84. Second fluid supply port 126, integrated into stab 124, is now in fluid communication with return port 82 via bypass port 100 and hydraulic cavity 96. With selector 102 in the second position, all hydraulic communication to fluid return port 82 is from the second fluid supply port 126 and communication from the first fluid supply port 80 is prevented.

As with the seals of coupler 10, the design and selection of seals 86, 93, 116, 118, 120, and 122 are critical to the performance of coupler 72 and depend on the particular location of the seal and the pressure requirements of the system. The preferred seals are resilient thermoplastic or elastomeric seals suitable for use in hydraulic systems in subsea environments. These seals may be an o-ring, or reinforced o-ring type seals for basic, low wear applications, and may be elastomeric seals reinforce with a stiff support, such as metal or composite. For example, seal 86 is a stationary seal that is pressure balanced when the coupler 72 is disengaged (exposed to external hydraulic pressure on both sides) and is exposed to external pressure on one side and hydraulic pressure on the opposite side when the coupler is engaged. Thus, seal 86 may appropriately be a thermoplastic, metallic, or reinforced elastomeric seal.

In considering seals that are potentially environmental barriers and/or highly cycled, such as seals 93, 116, 118, 120, and 122, a heavier duty, more robust seal design may be appropriate. Because these seals may repeatedly be subjected to energization and pressurization, a molded, metal reinforced elastomeric seal may be appropriate. It may also be preferred that this seal have a rounded or curved shape to reduce damage to the seal during repeated cycling. Those having skill in the arts of sealing hydraulic and subsea systems would realize any number of possible seal arrangements that may appropriate in this application and any combination or selection of seals may be possible. Additionally, the force generated by the make up of threads 90 on the interface 87 between body 74 and receptacle 84 may create a metal-to-metal seal barrier at this interface.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A hydraulic coupler comprising:
   a body having a first fluid supply port and a fluid return port in hydraulic communication;
   a selector disposed within said body and having a first position allowing hydraulic communication between the first fluid supply port and the fluid return port;
   a receptacle releasably connected to said body and providing one or more fluid conduits allowing fluid pressure to bias said selector into the first position; and
   a stab having a second fluid supply port therethrough and adapted to mechanically shift said selector to a second position providing hydraulic communication between the second fluid supply port, the one or more fluid conduits, and the fluid return port and preventing hydraulic communication between the first fluid supply port and the fluid return port.

2. The coupler of claim 1 further comprising a spring biasing said selector to the first position.

3. The coupler of claim 1 wherein said selector further comprises:
   a selector body sealingly engaging said body;
   a flange protruding from said selector body and sealingly engaging said receptacle when said selector is in the first position; and
   a rod extending from said flange and sealingly engaging said receptacle.

4. The coupler of claim 3 wherein said male stab further comprises a probe adapted to engage said rod to move said selector.

5. The coupler of claim 1 wherein said selector includes a first seal in sealing engagement with said body between the fluid return port and external fluid in the first position and further including an actuator that remotely operates the stab causing the stab to contact the selector.

6. A tubing hanger subjected to external fluid pressure during a running mode and disposed within a subsea tree during a completion mode, said tubing hanger comprising:
   a tubing hanger body having a first hydraulic supply port and a hydraulic return port therethrough;
   a cavity within said body providing fluid communication between the first hydraulic supply port and the hydraulic return port;
   a hydraulic coupler comprising a receptacle connected to said cavity and a selector slidably disposed within said cavity, wherein the selector has a first position allowing fluid communication between the first hydraulic supply port and the hydraulic return port;
   a fluid bypass port through said hydraulic coupler to allow external fluid to bias the selector to the first position;
   a male stab connected to the sub sea tree to engage the receptacle of said hydraulic coupler and shift the selector to a second position wherein fluid communication is prevented between the first hydraulic supply port and the hydraulic return port;
   and a second hydraulic supply port integrated into said male stab and in fluid communication with the hydraulic return port through the fluid bypass port when the shifter is in the second position.

7. The tubing hanger of claim 6 further comprising a spring biasing said selector to the first position.

8. The tubing hanger of claim 6 wherein the selector further comprises:
   a selector body sealingly engaging said tubing hanger body;
   a flange protruding from said selector body and sealingly engaging said receptacle when said selector is in the first position; and
   a rod extending from said flange and sealingly engaging said receptacle.

9. The tubing hanger of claim 8 wherein said male stab further comprises a probe adapted to engage said rod to move said selector.

10. A tubing hanger subjected to external fluid pressure during a running mode and disposed within a subsea tree during a completion mode, said tubing hanger comprising;
    a tubing hanger body having a first hydraulic supply port and a hydraulic return port therethrough:
    a cavity within said body providing fluid communication between the first hydraulic supply port and the hydraulic return port;
    a hydraulic coupler comprising a receptacle connected to said cavity and a selector slidably disposed within said cavity, wherein the selector has a first position allowing fluid communication between the first hydraulic supply port and the hydraulic return port;
    a fluid bypass port through said hydraulic coupler to allow external fluid to bias the selector to the first position;
    a male stab connected to the subsea tree to engage the receptacle of said hydraulic coupler and shift the selector to a second position wherein fluid communication is prevented between the first hydraulic supply port and the hydraulic return port; and
    a second hydraulic supply port integrated into said male stab and in fluid communication with the hydraulic return port through the fluid bypass port when the shifter is in the second position,
    wherein said selector includes a first seal in sealing engagement with said tubing hanger cavity between the fluid return port and external fluid in the first position and further including an actuator that remotely operates the stab causing the stab to contact the selector.

11. The tubing hanger of claim 10 wherein the first seal is in sealing engagement with said tubing hanger body cavity between the fluid return port and the first fluid supply port in the second position.

12. The tubing hanger of claim 10 wherein said selector include second and third seals in scaling engagement with said tubing hanger body cavity between the first fluid supply port and the fluid return port in the first position and on either side of the first fluid supply port in the second position.

13. A hydraulic coupler subjected to external fluid pressure, said coupler comprising:
   a body having a first hydraulic supply port and a fluid return port;
   a selector having a first position such that fluid communication is provided between the first hydraulic supply port and a hydraulic return port; wherein external fluid pressure biases said selector to the first position;
   a receptacle releasably connected to said body and having a fluid communication path extending through a wall of the receptacle;
   a male stab remotely actuable to shift said selector to a second position such that fluid communication is prevented between the first hydraulic supply port and the hydraulic return port and fluid communication is provided through a second hydraulic supply port, the fluid communication path, and the hydraulic return port.

14. The coupler of claim 13 further comprising a spring biasing said selector to the first position.

15. The coupler of claim 13 wherein the coupler is mounted in a body cavity and said selector further comprises:
   a selector body sealingly engaging said body cavity;
   a flange protruding from said selector body and sealingly engaging said receptacle when said selector is in the first position; and
   a rod extending from said flange and sealingly engaging said receptacle.

16. The coupler of claim 15 wherein said male stab further comprises a probe adapted to engage said rod to move said selector.

17. The coupler of claim 13 wherein said selector includes a first seal in sealing engagement with said body cavity between the fluid return port and external fluid in the first position and further including an actuator that remotely operates the stab causing the stab to contact the selector.

* * * * *